United States Patent [19]

Becker et al.

[11] Patent Number: 5,588,225

[45] Date of Patent: Dec. 31, 1996

[54] METHOD OF DRYING AN INJECTION MOLDING TOOL

[75] Inventors: Achim Becker, Darmstadt; Michael Zlotos, Biebesheim, both of Germany

[73] Assignee: Filterwerk Mann & Hummel GmbH, Ludwigsburg, Germany

[21] Appl. No.: 497,329

[22] Filed: Jun. 30, 1995

[30] Foreign Application Priority Data

Jun. 30, 1994 [DE] Germany ............ 44 22 674.8

[51] Int. Cl.⁶ .................................................. F26B 3/00
[52] U.S. Cl. ........................................... 34/474; 34/487
[58] Field of Search .................... 34/80, 202, 219, 34/229, 62, 66, 72, 73, 77, 362, 359, 364, 363, 369, 378, 413, 434, 442, 443, 467, 474, 487; 62/271, 71, 94

[56] References Cited

U.S. PATENT DOCUMENTS

| | | | |
|---|---|---|---|
| 3,789,093 | 1/1974 | Bose | 264/37 |
| 4,114,285 | 9/1978 | Cruff et al. | 34/487 |
| 4,151,236 | 4/1979 | Ryder | 264/39 |
| 4,413,426 | 11/1983 | Gräff | 34/473 |
| 4,803,787 | 2/1989 | Amann | 34/557 |

FOREIGN PATENT DOCUMENTS 849351  9/1960  United Kingdom .

OTHER PUBLICATIONS

Egle, et al., "Vermeiden von Schwitzwasser auf Spritzgiess- und Blaswerkzeugen", *Kunststoffe,* vol. 76, No. 1, Munich, Germany, Jan. 1986.

*Primary Examiner*—Henry A. Bennett
*Assistant Examiner*—Steve Gravini
*Attorney, Agent, or Firm*—Evenson, McKeown, Edwards & Lenahan, P.L.L.C.

[57] ABSTRACT

A method for drying the surface of a tool, particularly an injection molding tool, by feeding dry air from a drying device into a lower area of a chamber defined by a housing enclosing the tool. Moist air is removed from an upper area of the chamber and returned to the drying device, where moisture is removed from the air.

13 Claims, 2 Drawing Sheets

METHOD OF DRYING AN INJECTION MOLDING TOOL

BACKGROUND OF THE INVENTION

This invention relates to a method of drying a tool and, more particularly, to a method of drying an injection molding tool by circulating dry air from a drying device through a chamber containing the tool and returning moist air to the drying device.

When producing plastic parts in the injection molding process, it is necessary to cool the injection molding tool in order to reduce the station times. The more effective the cooling, that is, the faster the heat can be withdrawn from the produced part, the more rapidly the plastic part will solidify and can be removed from the tool.

It is known to be advantageous to supply coolant to the tool at a temperature of approximately 5° C. If the finished injection molded plastic part is moved in the case of a tool cooled in this manner, condensation water is formed very rapidly on the cooled tool because of the ambient air. During the next injection molding operation, this condensation water will cause a surface waviness on the surface of the plastic part to be produced. Attempts have been made to remove moisture from the tool by means of drying air. This drying air was blown directly onto the tool and flowed out into the atmosphere. In order to prevent an undefined outflow, the tool was partially enclosed.

A disadvantage of the previously described method is that a very large amount of air is required in order to keep the tool sufficiently dry. The large amount of supplied drying air naturally also results in a high energy requirement so that the efficiency of such a drying device was extremely unfavorable. The previously described method also allowed harmful vapors to escape into the atmosphere.

SUMMARY OF THE INVENTION

An object of the present invention is to provide a method of drying a tool which has optimum efficiency and which is very compatible with protecting the environment.

This object has been achieved by providing a method of drying a surface of an injection molding tool by feeding dry air from a drying device into a lower area of a chamber defined by a housing enclosing the tool, removing moist air from an upper area of the chamber, and returning the moist air to the drying device which removes moisture from the air.

A particular advantage of the invention is the recirculation and drying of the moisture-laden air. Special drying devices are required for this purpose. Such a drying device is known, for example, from Graeff, U.S. Pat. No. 4,413,426. This patent describes a drying device for drying outgoing air from bulk material drying containers, in which the outgoing air is guided through at least one chamber filled with an absorbent and is again guided to a drying container in a closed circulating system. The chamber filled with the absorbent is regenerated at intervals with a second air circulation. Instead of drying the bulk material, this device may also be used for drying the injection molding tool.

Another advantage of the invention is that the flow in the enclosed tool chamber takes place in a concurrent flow direction with the natural water vapor flow direction. Since water vapor is lighter than air, the water vapor will rise, and therefore the upwardly sweeping air will assist in the removal of the water vapor from the chamber.

In an embodiment of the invention, the drying air is introduced by way of a distributor element, such as a special perforated plate, into the tool chamber. As a result, the flow takes place in the chamber in a manner which is as laminar as possible, so that a relatively uniform air distribution is achieved along the whole lower cross-sectional area of the enclosed chamber.

In order to further optimize the air distribution, the perforated plate is equipped with a defined pressure loss, for example, by the arrangement of nozzles or constricting apertures. The pressure loss at the perforated plate can be adjusted to an optimal flow action.

Naturally, an injection molding tool cannot be enclosed completely in the sense of an absolute seal of the chamber. Therefore, the moisture-laden air which is to be removed from the chamber is discharged through a valve. By means of the valve, a defined overpressure can be set in the chamber so that no moisture can enter at leakage points, and only drying air can emerge.

In the case of an injection molding tool, the produced parts must either be removed by means of a robot arm or must be ejected by means of an ejector and be fed to a container. For this purpose, openings are required in the housing. In order to avoid unnecessarily high leakage air rates, these openings must be closed by air locks or flaps.

According to a further embodiment of the invention, the supplied drying air is fed to the tool directly from the drying device without any intermediate cooling. Cooling is normally required so that the inflowing drying air will not significantly heat up the tool. However, since the drying method according to the invention involves relatively small amounts of air, the transmitted amount of heat is also extremely small, so that it is unnecessary to cool the process air.

In order to further optimize the method, it is suggested according to an advantageous further embodiment of the invention that, when the production operation is interrupted, which occurs, for example, when the tool is repaired or during servicing, the cooling temperature is raised to a point which is above the dew point temperature. This temperature point may, for example, be 30° C., depending upon the local environmental conditions. This can effectively prevent the formation of condensate on the tool during an interruption of the production.

Any air leaking from the chamber is replaced by fresh air. The fresh air is fed into the drying device. A predehumidifying device is connected in front of the drying device for this purpose. This device consists of a heat exchanger which cools the entering fresh air to a temperature of from 5° C. to 10° C. An aerosol precipitation device is connected behind the heat exchanger and is used for precipitating the condensed water droplets.

According to a further embodiment of the invention, the air outlet or the distributor element may be arranged directly on the tool. Thus, the distributor element may, for example, be fastened below the tool or may be integrated into the tool. In this case, air outlet nozzles are situated at corresponding points in the tool, and the drying air flows out through the air outlet nozzles and prevents formation of condensate in the critical area of the tool.

These and additional features of preferred embodiments of the invention are found in the specification and the drawings. It is to be understood that the individual features may be implemented separately or in combination, and may represent advantageous as well as separately patentable constructions.

Other objects, advantages and novel features of the present invention will become apparent from the following detailed description of the invention when considered in conjunction with the accompanying drawings.

DETAILED DESCRIPTION OF PREFERRED EMBODIMENTS

Figure 1:
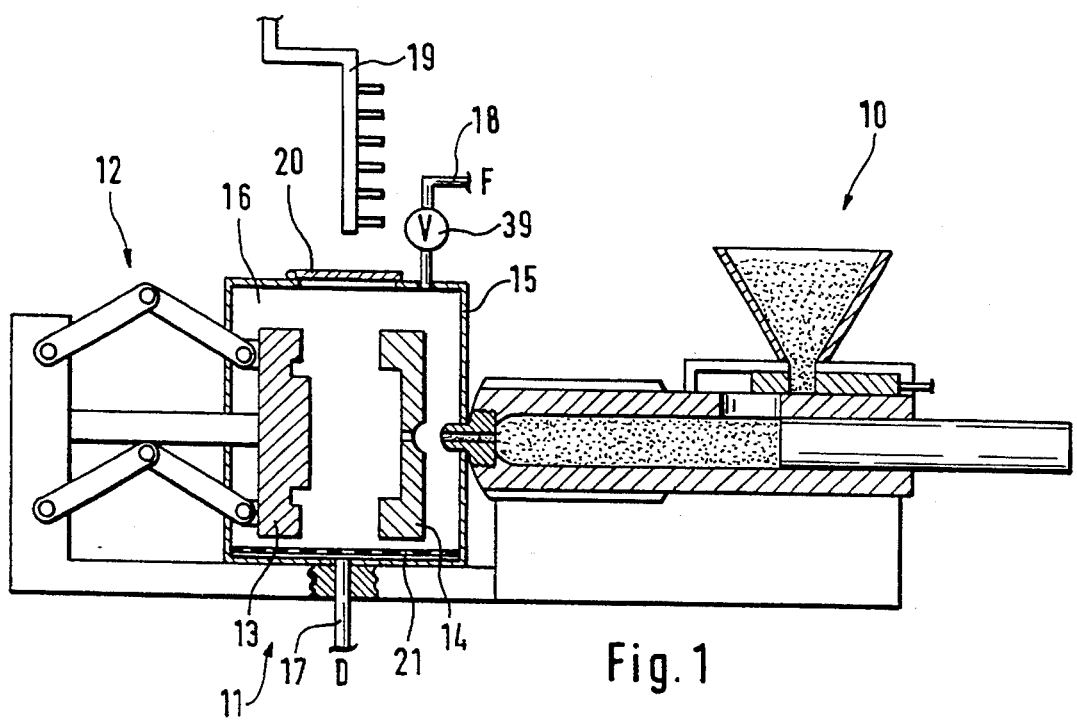
FIG. 1 is a schematic view of an injection molding machine.

The injection molding machine illustrated in FIG. 1 comprises a melting unit 10, a mold 11 and a locking device 12. The mold 11, in turn, comprises two mold halves 13, which are illustrated in the opened condition. The mold 11 is surrounded by a housing 15 which is closed on all sides and which therefore provides an enclosed chamber 16. An air inlet duct 17 with a connection D is shown connected to the lower area of the housing 15, and an air outlet duct 18 with a connection F is illustrated connected to the upper area of the housing 15.

For removing the plastic injection-molded parts produced in the mold, a robot arm or removal arm 19 is arranged above the housing 15. This robot arm or removal arm 19 dips into the housing 15 when the flap 20 is open, removes the parts there and transfers them to a processing station which is not shown here.

In the lower area of the housing 15, an air distributing device 21 in the form of a perforated plate is situated which generates a defined pressure loss. The perforated plate is provided, for example, with defined nozzle openings. By means of this air distributor 21, the flow in the chamber 16 takes place in a manner which is as laminar as possible. For this purpose, a relatively uniform air distribution over the lower cross-sectional area of the chamber is required. The drying air flowing in by way of connection D therefore displaces the moisture-laden ambient air and prevents condensation of the air humidity on the two mold halves. The mold is cooled in order to accelerate the injection molding process. The cooling takes place by means of coolant ducts in the mold which are not shown here. The coolant temperature preferably is about 5° C.

It is also possible to integrate the air distribution, that is, the air distributor 21 directly into the injection molding told. A distributor nozzle or a distributor nozzle arrangement may be mounted directly on the lower edges of the mold. The drying air sweeps over the mold from the direction of these nozzles and therefore keeps the mold free of condensation water.

Since the housing 15 is closed on all sides and a slight overpressure exists inside the housing, it is ensured that no moisture-laden outside air penetrates into the housing. Since, in addition, the injection molding operation creates no moisture or only extremely small amounts of moisture, a low drying air flow is sufficient to prevent condensation. The air, which flows out of the mold chamber, reaches the connection point F by way of the air outlet duct 18.

Figure 2:
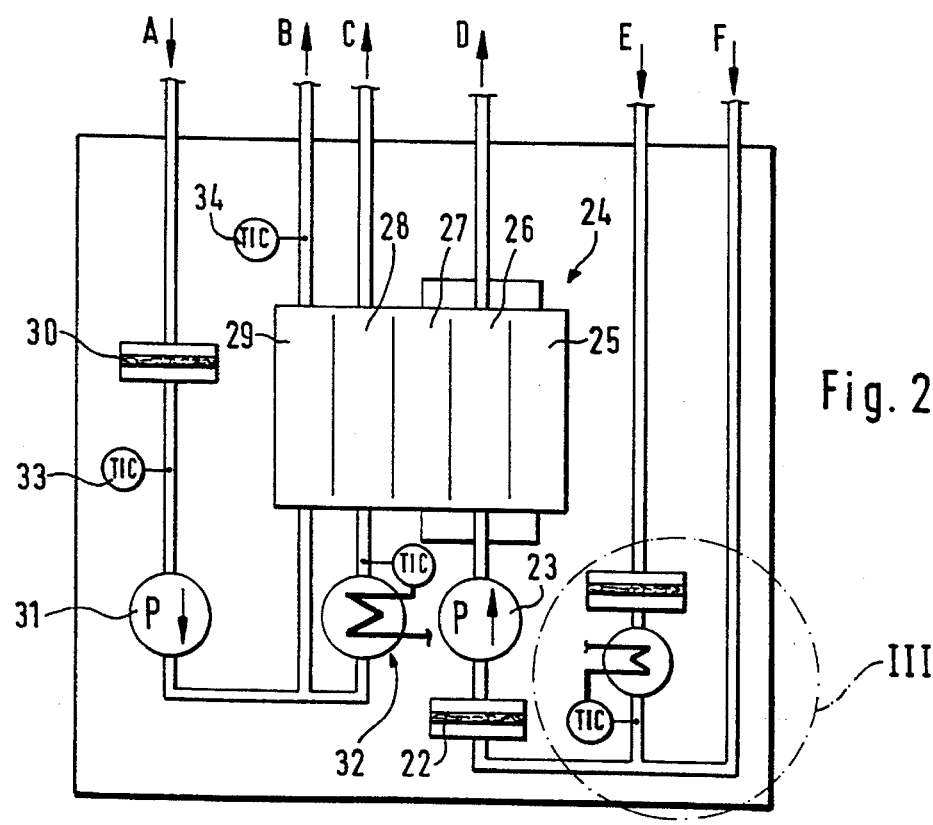
FIG. 2 is a view of a drying device.

FIG. 2 illustrates a drying device for drying air. Such a drying device is described, for example, in U.S. Pat. No. 4,413,426. The air flowing out of the air outlet duct 18 reaches the connection F, travels from there through a filter 22 and a feed pump 23 to the actual drying device 24. In this drying device, the moisture is withdrawn from the air and the dehumidified air is returned to the mold 11 via the connection D. The drying device 24 is a revolving dryer; that is, while three chambers 25, 26, 27 are used for drying air, the other chambers 28, 29 are regenerated. For the regeneration, heated air is conveyed through the chamber 28 via the connection A and a filter 30 as well as a feed pump 31 and a heating and control device 32. This heated air removes the moisture from this chamber and discharges it through connection C. The air supplied through connection A also flows through the chamber 29; however, it is not heated but is used for cooling this chamber. The cooling air is discharged through connection B. Temperature sensors 33, 34 with control devices are also arranged in the system.

Figure 3:
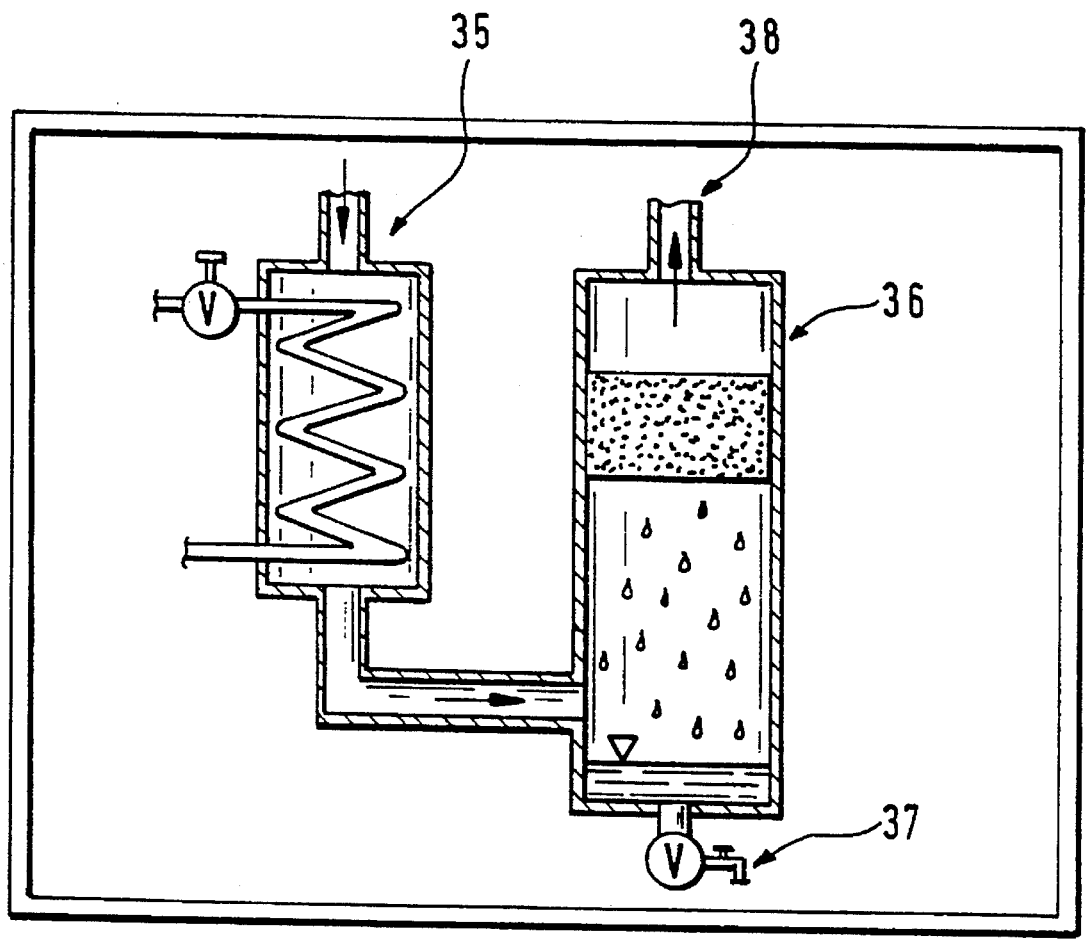
FIG. 3 is an enlarged view of the predehumidifying device in the area III of FIG. 2.

Connection E is used for introducing fresh air. This connection has the purpose of replacing any air leaking from the cycle process. The fresh air is fed into the air flowing through connection F after being predehumidified as is explained in detail by way of a predehumidifying device according to FIG. 3, which shows an enlarged view of the detail III from FIG. 2.

The predehumidifying device comprises a heat exchanger 35 and an aerosol precipitation device 36. The entering air is cooled in the heat exchanger to a temperature of approximately 5° to 10° C. The aerosol precipitation device 36 is connected behind the heat exchanger, by means of which the condensed water droplets are precipitated. The water can be removed through the outlet 37. The predehumidified air flowing through outlet 38 joins the air flowing through connection F and arrives at the filter 22 illustrated in FIG. 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of drying a surface of an injection molding tool comprising the steps of:

feeding dry air from a drying device into a lower area of a chamber defined by a housing enclosing the tool;

removing moist air from an upper area of the chamber; and returning said moist air to said drying device which removes moisture from the moist air.

2. A method according to claim 1, further comprising providing a distributor element below the tool to distribute the dry air in a uniform manner into the chamber.

3. A method according to claim 2, further comprising adjusting a defined pressure loss on the distributor element.

4. A method according to claim 1, further comprising providing a controllable valve which controls the return of the moist air to the drying device to maintain an increased pressure inside the chamber.

5. A method according to claim 1, wherein air locks or closable openings are arranged in the housing for the removal of parts produced in the tool.

6. A method according to claim 1, wherein the dry air from the drying device is fed directly to the tool.

7. A method according to claim 1, further comprising heating the tool to a temperature above a dew point temperature based on environmental conditions, during an interruption of a production process using the method.

8. A method according to claim 1, further comprising feeding fresh air into the drying device to replace air which escapes during use of the method.

9. A method of drying a surface of an injection molding tool comprising the steps of:

feeding dry air from a drying device into a lower area of a chamber defined by a housing enclosing the tool;

removing moist air from an upper area of the chamber;

returning said moist air to said drying device which removes moisture from the moist air; and feeding fresh air into the drying device through a predehumidifying device comprising a heat exchanger and an aerosol precipitation device to replace air which escapes during use of the method.

10. A method according to claim 2, wherein said distributor element is integrally incorporated in said tool for distributing the air in a uniform manner into the chamber.

11. A method according to claim 1, wherein said lower area is below said tool and said upper area is above said tool.

12. A method according to claim 1, wherein said chamber is closed on all sides.

13. A method of drying a surface of an injection molding tool comprising the steps of:

feeding dry air from a drying device into a lower area of a chamber defined by a housing enclosing the tool;

removing moist air from an upper area of the chamber; and returning said moist air to said drying device which removes moisture from the moist air, wherein said dry air sweeps over the surface of the tool to prevent water from condensing thereon.

* * * * *